(12) United States Patent
Da Pont et al.

(10) Patent No.: US 10,422,669 B2
(45) Date of Patent: Sep. 24, 2019

(54) DEVICE FOR MEASURING THE FLOW RATE OF A FLUID, IN PARTICULAR A LIQUID

(75) Inventors: Paolo Da Pont, Turin (IT); Giorgio Carrer, Turin (IT); Maurizio Rendesi, Villarbasse (IT); Giorgio Molino, Givoletto (IT)

(73) Assignee: ELBI INTERNATIONAL S.P.A., Turin (IT)

( * ) Notice: Subject to any disclaimer, the term of this patent is extended or adjusted under 35 U.S.C. 154(b) by 1193 days.

(21) Appl. No.: 13/518,766

(22) PCT Filed: Dec. 24, 2010

(86) PCT No.: PCT/IB2010/056069
§ 371 (c)(1),
(2), (4) Date: Jun. 22, 2012

(87) PCT Pub. No.: WO2011/077412
PCT Pub. Date: Jun. 30, 2011

(65) Prior Publication Data
US 2012/0271567 A1    Oct. 25, 2012

(30) Foreign Application Priority Data
Dec. 24, 2009  (IT) .............................. TO2009A1044

(51) Int. Cl.
*G01F 1/115*  (2006.01)
*G01F 1/075*  (2006.01)
*G01F 1/08*   (2006.01)
*G01F 1/12*   (2006.01)

(52) U.S. Cl.
CPC .............. *G01F 1/115* (2013.01); *G01F 1/075* (2013.01); *G01F 1/08* (2013.01); *G01F 1/12* (2013.01); *G01F 1/125* (2013.01)

(58) Field of Classification Search
CPC ...................................................... G01F 1/115
See application file for complete search history.

(56) References Cited

U.S. PATENT DOCUMENTS

| 3,693,435 | A |   | 9/1972  | Cox et al. |          |
|-----------|---|---|---------|------------|----------|
| 3,945,253 | A | * | 3/1976  | Liu et al. ................... 73/861.02 |
| 4,438,648 | A | * | 3/1984  | Cheney, Jr. .............. G01F 1/00 73/195 |
| 4,885,943 | A |   | 12/1989 | Tootell et al. |    |
| 5,435,188 | A | * | 7/1995  | Lew et al. ................. 73/861.22 |

(Continued)

FOREIGN PATENT DOCUMENTS

EP    1 983 310 A1    10/2008

OTHER PUBLICATIONS

International Search Report for PCT/IB2010/056069, dated Apr. 6, 2011.
Italian Search Report for TO2009A001044, dated Aug. 12, 2010.

*Primary Examiner* — Hyun D Park
(74) *Attorney, Agent, or Firm* — Sughrue Mion, PLLC (57) ABSTRACT

A device for measuring the flow rate of a fluid, including a bladed impeller mounted in the conduit to be driven in rotation by the flow of the fluid, and to which at least one magnet is fixed, and a magnetic field sensor arranged near the conduit to generate a signal each time the magnet of the impeller, passes thereby. The number of signals generated by the sensor in a period of time is representative of the flow rate of the fluid.

4 Claims, 6 Drawing Sheets

(56) References Cited

U.S. PATENT DOCUMENTS 5,927,400 A 7/1999 Bononi et al.
6,611,785 B1 * 8/2003 Yamanaka ............ G01F 1/3209
702/155

* cited by examiner

DEVICE FOR MEASURING THE FLOW RATE OF A FLUID, IN PARTICULAR A LIQUID

CROSS REFERENCE TO RELATED APPLICATION

This application is a National Stage of International Application No. PCT/IB2010/056069, filed on Dec. 24, 2010, which claims priority from Italian Patent Application No. TO2009A001044, filed Dec. 24, 2009, the contents of all of which are incorporated herein by reference in their entirety.

BACKGROUND OF THE INVENTION

Field of the Invention

The present invention in general refers to the measurement of the flow rate of fluids, in particular of liquids.

Background

One purpose of the present invention is that of providing innovative solutions for a more accurate measurement of the flow rate of at least one fluid, in particular of at least one liquid, in at least one conduit, which can be used for example in household appliances.

SUMMARY OF THE INVENTION

This and other purposes are achieved according to the invention with a measuring device for measuring the flow rate of a fluid, in a conduit, comprising
  at least one bladed impeller, mounted in the conduit so as to be driven in rotation by the flow of the fluid and to which at least one magnet is fixed, and
  at least one magnetic field sensor arranged in a fixed position near the conduit and capable of causing a signal or pulse to be emitted each time the magnet of the impeller passes thereby;
  the arrangement being such that the number of signals or pulses generated by said sensor in a period of time is representative, according to a predetermined relationship, of the flow rate of the fluid in the associated conduit; and in which
  said at least one magnetic field sensor is coupled to a processing and control circuit including a microprocessor with associated memory means, predisposed for processing in predetermined manners the signals issued by said at least one sensor, and providing at its output a digital signal having at least one feature which varies in a predetermined manner as a function of the flow rate of the fluid in the conduit.

In one embodiment in which the aforementioned relationship between the number of pulses of the sensor and the flow rate of the fluid in the conduit is non-linear, the aforementioned memory means store correction data by which, upon variation of the flow rate of the fluid in the conduit, the ratio of the value of said flow rate to the corresponding number of pulses emitted by the sensor is variable such as to compensate the non-linearity of said relationship; the microprocessor operated processing and control circuit being predisposed for providing at its output a digital signal having a feature which varies in a substantially linear manner as a function of the flow rate of the fluid in the conduit.

The invention also covers a device that makes it possible to measure the flow rate of at least two fluids in corresponding conduits of an apparatus, in which there are provided respective impellers, with respective magnets and respective associated sensors coupled to corresponding inputs of the processing and control circuit, the latter being predisposed for providing a digital output signal having a modulated pulse-width or duration having one feature representative of the sum of the flow rates of fluid in said conduits.

In a variant of a device of the type defined so far, the processing and control circuit is predisposed for providing a digital output signal with a modulated pulse-width or duration having a first feature which, with reference to the sum of the flow rates in said conduits, represents the share or percentage pertaining to the flow rate in one of said conduits.

According to a further variant, said processing and control circuit is predisposed for providing a digital serial output signal which, in subsequent predetermined time periods, is representative of the flow rate of the fluid in the first and in the second conduit, respectively.

BRIEF DESCRIPTION OF THE DRAWINGS

Further characteristics and advantages of the present invention shall become clearer from the following detailed description, purely given as a non limiting example with reference to the attached drawings, in which.

DETAILED DESCRIPTION OF THE INVENTION

Figure 1:
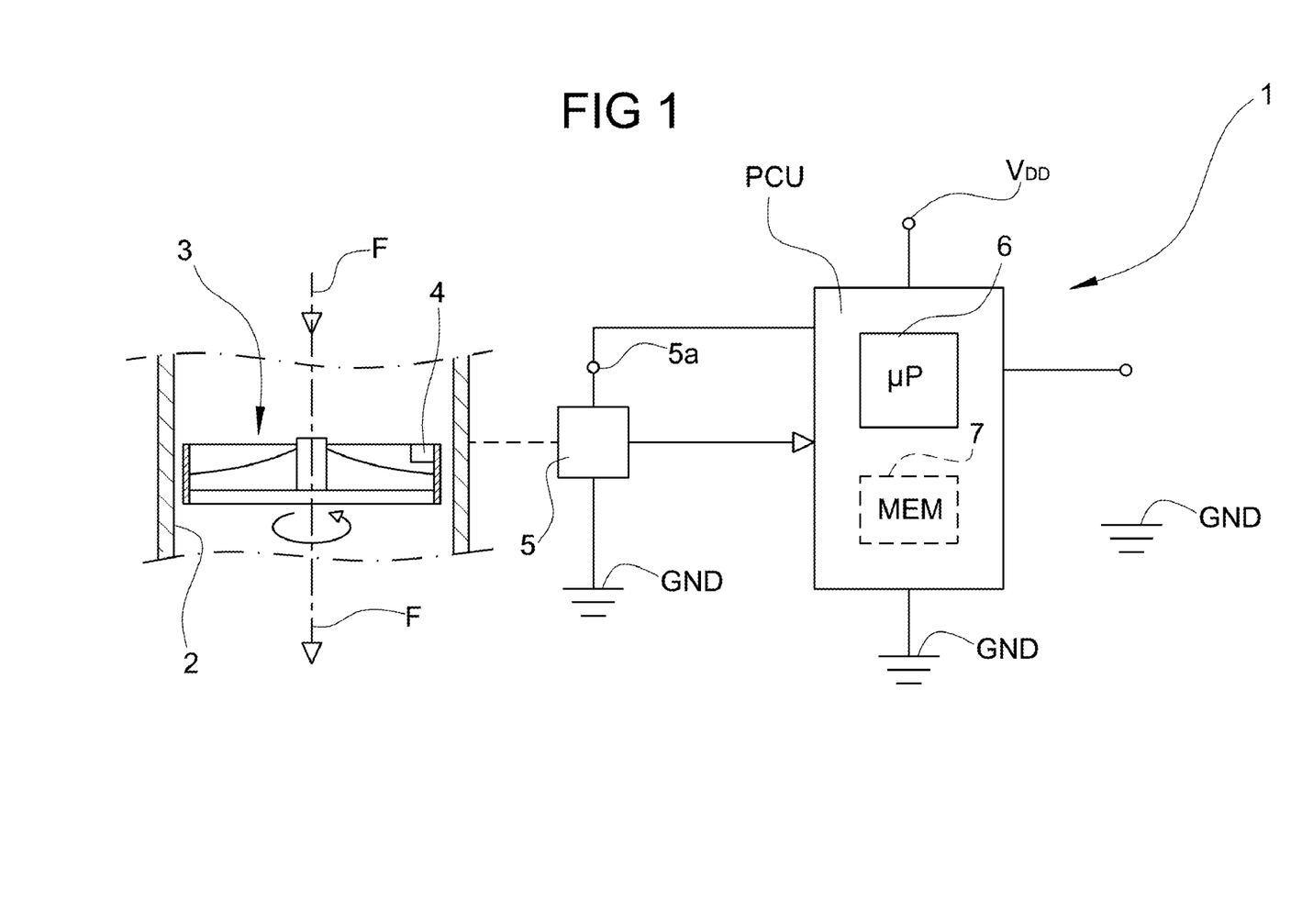
FIG. 1 is a schematic representation of a first device for measuring flow rate according to the present invention.

In FIG. 1 a device for measuring the flow rate of a fluid, in particular a liquid in a conduit 2 is wholly indicated with reference numeral 1. Such a device comprises a bladed impeller or turbine 3 of the per se known type, mounted in the conduit 2 so as to be driven in rotation by the flow of the fluid, as represented by the arrows F.

The impeller 3 has a permanent magnet 4 around its periphery.

The device for measuring the flow rate 1 also comprises a magnetic field sensor 5, arranged in a fixed position near to the conduit 2, so as to lead to the generation of a signal (pulse) each time the magnet 4 of the impeller 3 passes nearby.

The sensor 5 can be for example a so called reed relay, or a Hall effect sensor, a magnetoresistance sensor, or yet others.

In its operation, the number n of pulses generated by the sensor 5 in a period of time is representative, according to a predetermined relationship, of the flow rate Q of fluid in the conduit 2.

The output sensor 5 is connected to the input of a processing and control circuit PCU of the per se known type, including a microprocessor 6 with associated memory devices 7.

In the example embodiment illustrated, the processing and control circuit PCU receives direct supply voltage $V_{dd}$ from a voltage supply unit not illustrated, and in operation, when necessary, it applies a direct voltage to a supply terminal 5a of the sensor 5.

The processing and control circuit PCU is predisposed, in predetermined manners, for processing the signals (pulses) emitted by the sensor 5, and for providing at its output a digital signal having at least one feature which varies in a predetermined manner as a function of the flow rate Q of the fluid in the conduit 2.

In general, the relationship present between the number n of pulses emitted by the sensor 5 and the flow rate (Q) of the fluid in the conduit 2 is non-linear.

Advantageously, therefore, predetermined correction data are stored in the memory devices 7, by which, upon variation of the flow rate Q of the fluid in the conduit 2, the ratio k between the value of said flow rate Q and the corresponding number n of pulses emitted by the sensor 5 is variable such as to compensate the non-linearity of said relationship.

The microprocessor operated processing and control circuit EPCU can advantageously be predisposed for providing at its output a digital signal having a feature which varies in a substantially linear manner as a function of the flow rate Q of the fluid in the conduit 2. For example, such a signal can be a signal having a modulated pulse-width or duration, the "on" time of which varies in a substantially linear manner as a function of the flow rate of the fluid in the conduit 2.

Figure 2:
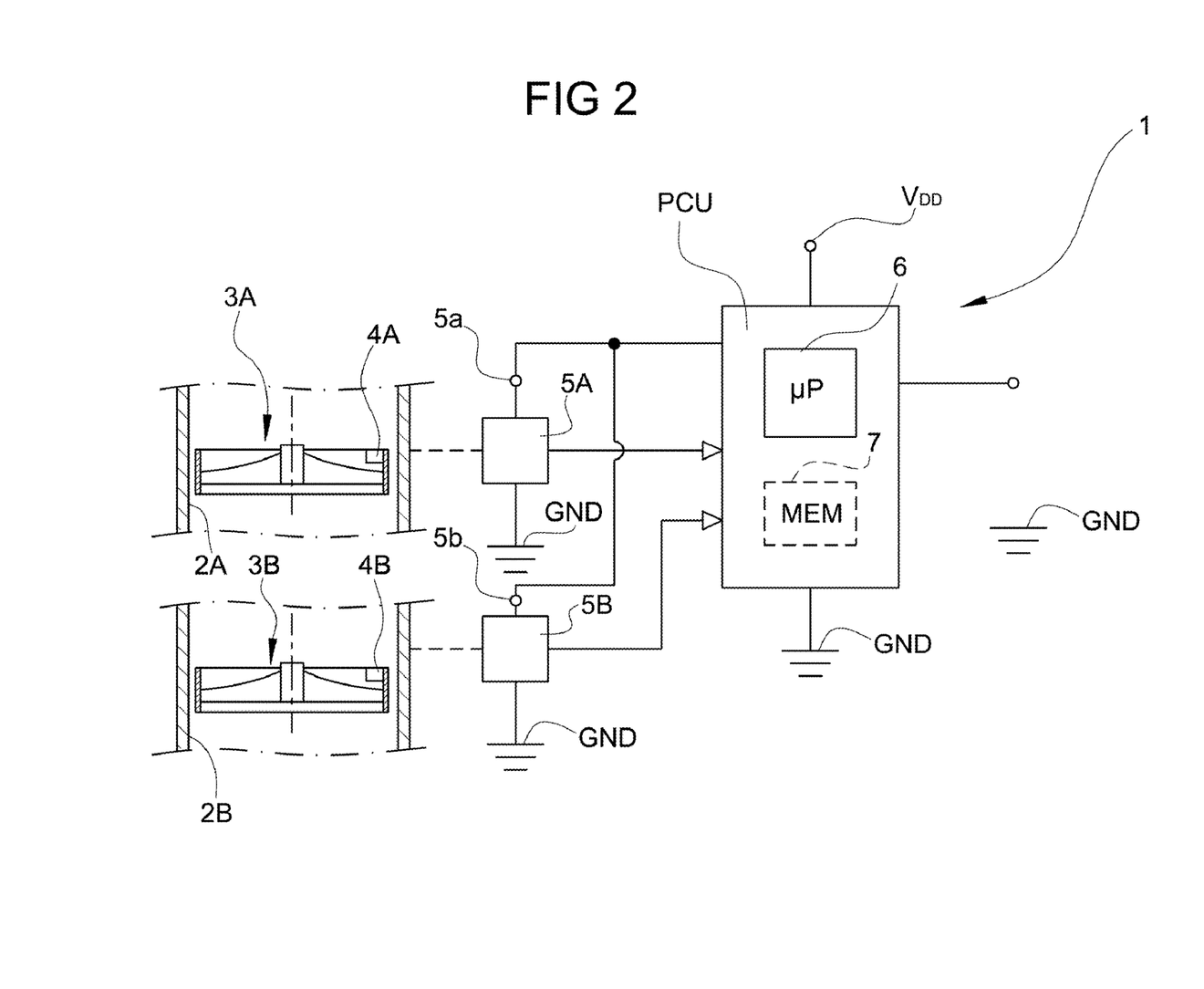
FIG. 2 is a schematic representation of a second device for measuring flow rate according to the invention, for measuring the flow rates of two fluids in corresponding conduits.

FIG. 2 schematically represents another device for measuring the flow rate according to the present invention. In such a Figure, parts and elements that have already been described have again been given the same reference numerals used previously.

The device 1 represented in FIG. 2 makes it possible to measure the flow rate of two fluids flowing in respective conduits 2A and 2B of one same hydraulic apparatus, for example a same household appliance. The conduits 2A and 2B are for example conduits through which a same header can be supplied with a hot or cold water flow, respectively.

In the conduits 2A and 2B there are provided respective impellers 3A and 3B, with respective magnets 4A and 4B, to which respective sensors 5A and 5B are associated, coupled to corresponding signal inputs of the processing and control circuit PCU.

In the embodiment illustrated in FIG. 2 the magnetic field sensors 5A and 5B have the respective supply terminals 5a, 5b coupled to a same supply output of the processing and control circuit PCU.

Figure 3:
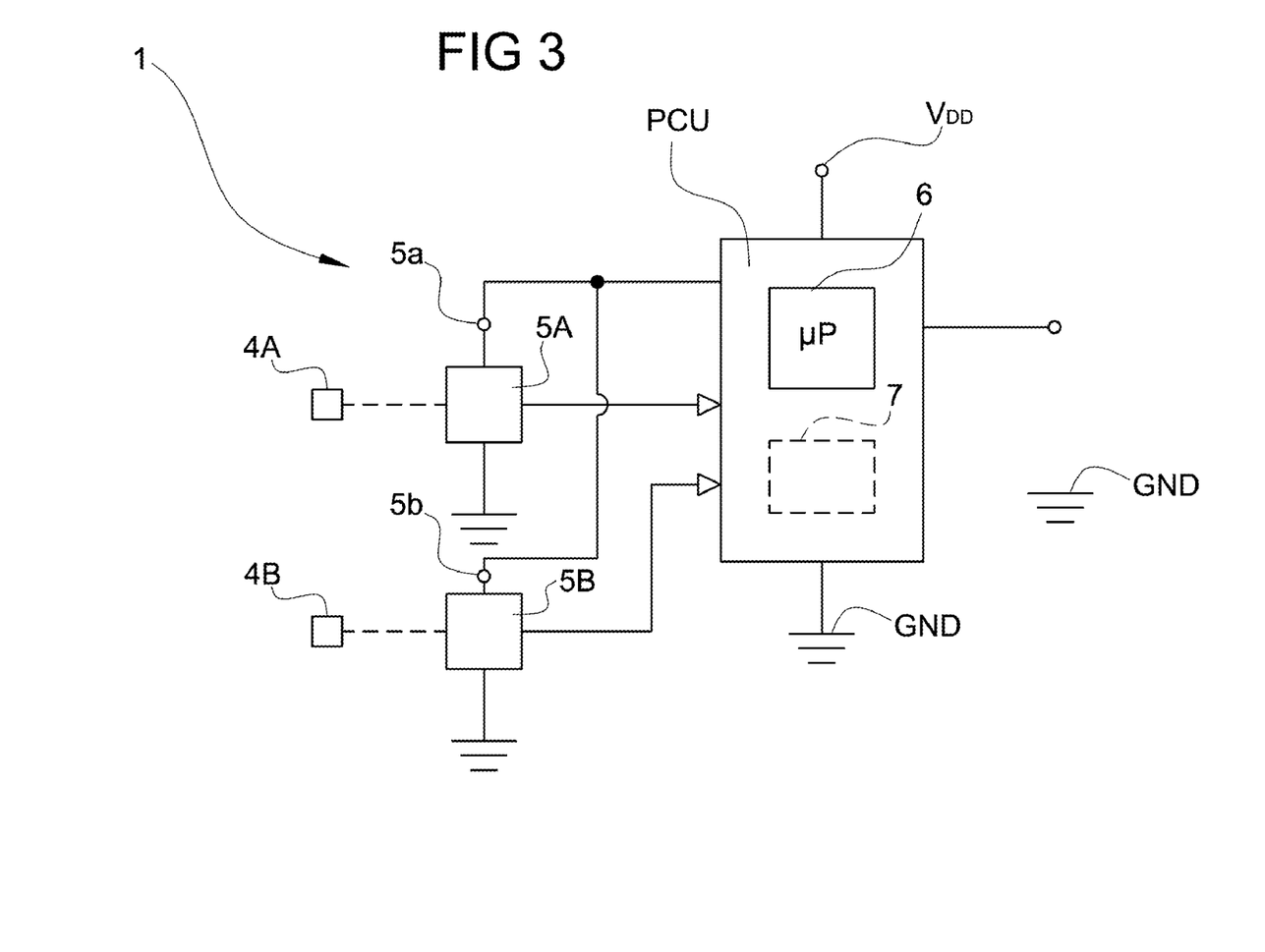
FIG. 3 is a schematic representation of a variant embodiment of the device according to FIG. 2; and
  Figures from 4 to 6 are explanatory diagrams of the characteristics of the output signal supplied by a processing and control circuit of a device for measuring the flow rate according to the invention, in three variants in terms of embodiments or operation.

In the variant embodiment shown in FIG. 3, the supply terminals 5a and 5b of the magnetic field sensors 5A and 5B are on the other hand connected to respective separated supply outputs of the processing and control circuit PCU, and the latter is predisposed for selectively supplying power to said sensors 5A and 5B either simultaneously or singularly. This makes it possible to acquire the signals provided by the two sensors separately, while keeping the sensor, the signal of which is not being acquired, in stand-by.

Figure 4:
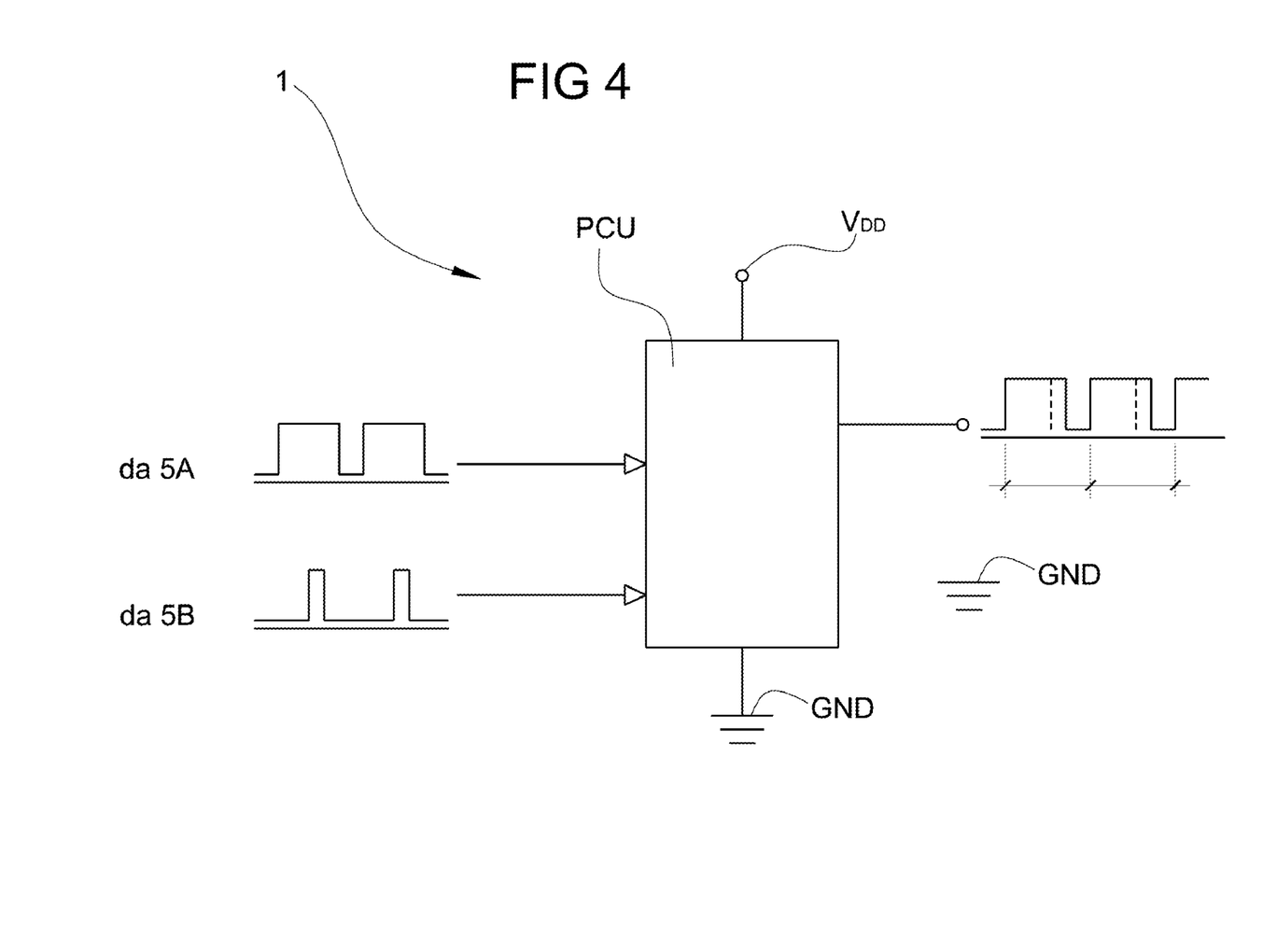

In the embodiments according to FIGS. 2 and 3, the processing and control circuit PCU can be predisposed for providing at its output a digital signal having a modulated pulse-width or duration having one feature representative of the sum of the flow rates of the fluids flowing in the conduits 2A and 2B. Such a signal has for example the feature illustrated in FIG. 4, in which it is considered for the signals provided by the sensors 5A and 5B to essentially be PWM-type signals with respective pulse durations that are proportional to the flow rates of the fluids in the associated conduits 2A and 2B. The corresponding output signal provided by the circuit PCU is still a signal having a modulated pulse-width or duration, in which the pulse duration (""on"-time) corresponds to the sum of the durations of the pulses of the signals provided by the two magnetic field sensors 5A and 5B.

Figure 5:
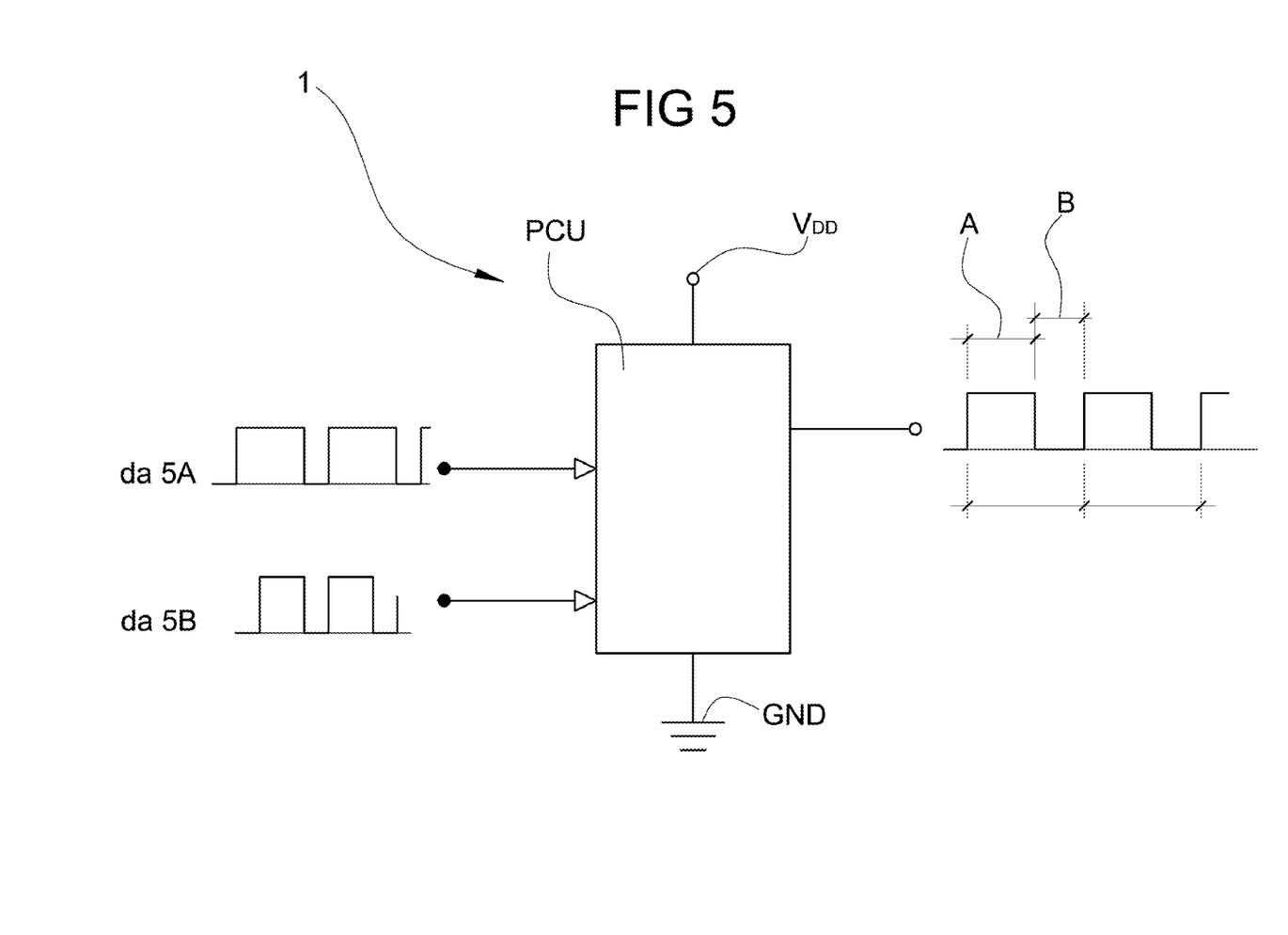

In a variant embodiment, considered in FIG. 5, the processing and control circuit PCU is predisposed for providing at its output a digital signal having a modulated pulse-width or duration, having a feature that indicates, with reference to the sum of the flow rates of fluid in the conduits 2A and 2B, the percentage share pertaining to the flow rate in one of such conduits. In the example illustrated, the signal in output from the processing and control circuit PCU has a "high" level duration A ("on" time) that indicates the percentage, with respect to the sum of the flow rates, which corresponds to the flow rate in the conduit 2A. On the other hand, the "low" level B duration ("off" time) is representative of the share or percentage of the total corresponding to the flow rate of fluid in the conduit 2B.

Figure 6:
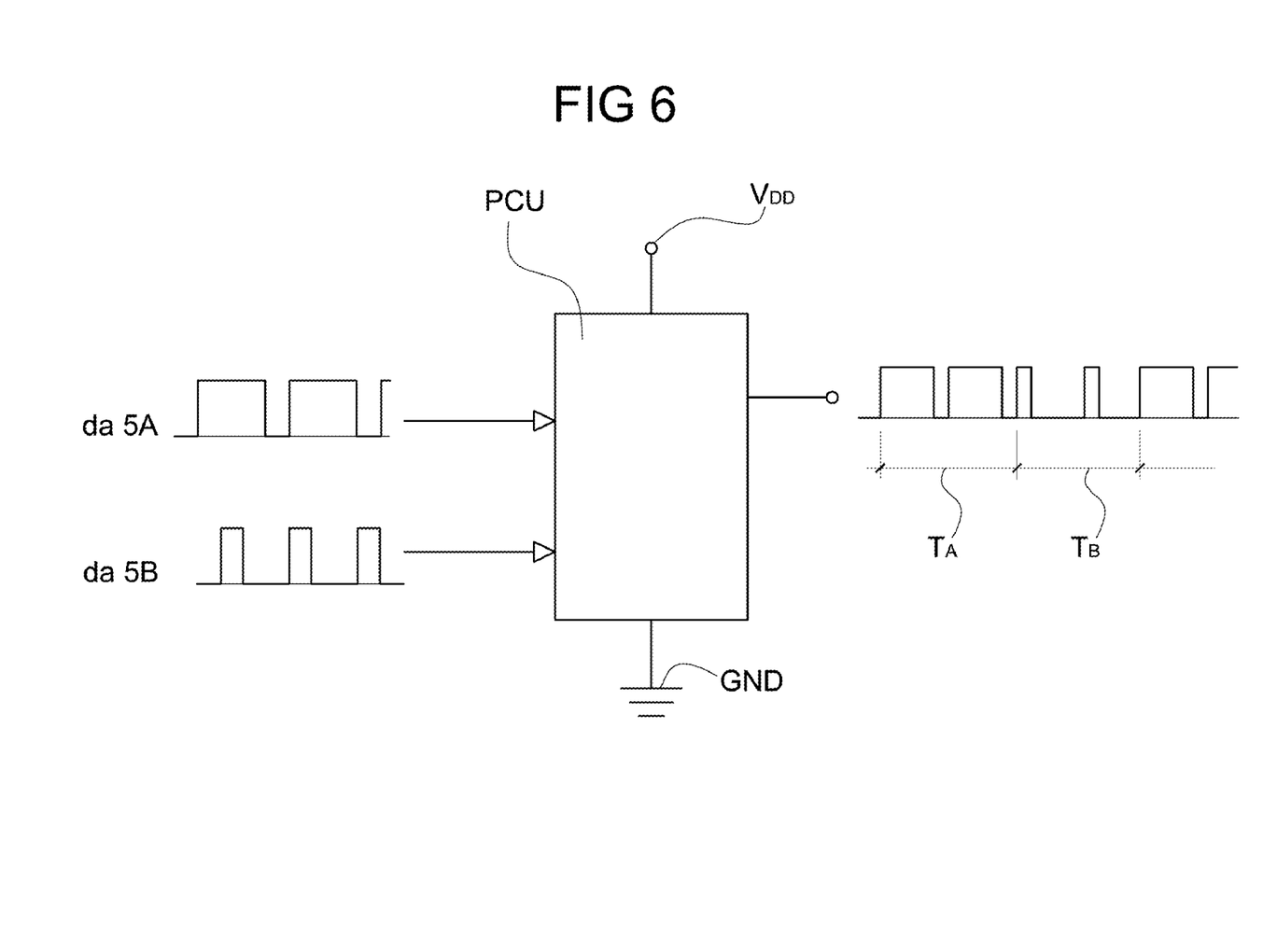

In a further variant, considered in FIG. 6, the processing and control circuit PCU is on the other hand, essentially predisposed to operate as a multiplexer: such a circuit is predisposed for providing a digital serial output signal which, in subsequent predetermined time periods $T_A$ and $T_B$, is representative of the flow rate of fluid in the conduit 2A and, respectively, in the conduit 2B.

In further non illustrated variants, the circuit PCU is provided with two distinct outputs and is predisposed for providing on such outputs signals representative of the flow rates of the fluids in the conduit 2A and in the conduit 2B, respectively.

In general, the circuit or PCU unit can also advantageously be predisposed for performing a filtering action on the signals provided by the magnetic field sensor/s.

Of course, without affecting the principle of the finding, the particular embodiments can be widely varied with respect to what has been described and illustrated purely as an example and not for limiting purposes, without for this reason departing from the invention as defined in the attached claims.

The invention claimed is:

1. A device for measuring the flow rates of fluids in a first conduit and a second conduit, comprising:
   a first bladed impeller and a second bladed impeller mounted in the first conduit and the second conduit, respectively, so as to be driven in rotation by flows of the fluid in the first conduit and second conduit, respectively, a first magnet and a second magnet being fixed to the first bladed impeller and second bladed impeller, respectively; and
   a first magnetic field sensor and a second magnetic field sensor arranged in a fixed position near the first conduit and second conduit, respectively, and capable of causing the generation of a pulse each time the first magnet and second magnet pass by the first magnetic field sensor and second magnetic field sensor, respectively, the arrangement being such that numbers of pulses generated by each of said first and second magnetic field sensors in a period of time are representative, according to a predetermined relationship, of the flow rates of the fluid in the first and second conduits, respectively,
   wherein said first and second magnetic field sensors are coupled to a processing and a control circuit including a microprocessor and associated memory means, predisposed for processing in predetermined manners the pulses issued by said first and second magnetic field sensors, and providing a digital output signal which varies as a function of the flow rates of the fluid in the first and second conduits, wherein said relationship between the numbers of pulses from each of the first and second magnetic field sensors and the flow rates of the fluid in the first and second conduits, respectively, is non-linear, and in said memory means there are stored predetermined correction data by which, upon variation of the flow rates of the fluid in the first conduit or in the second conduit, the ratio of the value of said flow rates to the corresponding numbers of pulses emitted by the first or second magnetic field sensor, respectively, is variable such as to compensate the non-linearity of said relationship, and wherein the processing and control circuit is predisposed for providing at its output a pulse width modulation (PWM) digital signal having a constant frequency and a modulated pulse-width or duration, the PWM digital signal having an on time during which the PWM digital signal is at a first level, and an off time during which the PWM digital signal is at a second level lower than the first level, wherein the on time corresponds only to flow rate in the first conduit and varies in a substantially linear manner as a function of the flow rate of the fluid in the first conduit, and the off time corresponds only to flow rate in the second conduit and varies in a substantially linear manner as a function of the flow rate of the fluid in the second conduit, said on time and off time representing, with reference to the sum of the flow rates in said first and second conduits, a share or percentage pertaining to the flow rate in the first conduit and in the second conduit, respectively.

2. A device according to claim 1, wherein said sensors have respective supply terminals connected to respective supply outputs of the processing and control circuit, which is predisposed for selectively supplying power to said sensors either simultaneously or singularly.

3. A device according to claim 1, wherein said sensors have respective supply terminals coupled to a same supply output of the processing and control circuit.

4. A device according to claim 1, wherein the processing and control circuit is predisposed for performing a filtering action on the signals provided by said sensor.

\* \* \* \* \*